United States Patent [19]
Miller

[11] Patent Number: 5,246,754
[45] Date of Patent: Sep. 21, 1993

[54] POST POLE OR BEAM MADE FROM RECYCLED SCRAP MATERIAL

[76] Inventor: Edward L. Miller, 3501 Woolman Dr., Haymarket, Va. 22069

[21] Appl. No.: 729,144

[22] Filed: Jul. 12, 1991

[51] Int. Cl.⁵ .............................................. B29D 23/00
[52] U.S. Cl. ............................ 428/36.91; 52/DIG. 9; 156/95; 428/903.3
[58] Field of Search ................ 156/61, 95; 428/903.3, 428/2; 256/1; 52/DIG. 9

[56] References Cited

U.S. PATENT DOCUMENTS

| | | | |
|---|---|---|---|
| 2,843,074 | 7/1958 | Norman | 428/903.3 X |
| 3,803,792 | 4/1974 | Fulton | 428/903.3 X |
| 3,928,701 | 12/1975 | Roehner | 428/131 X |
| 4,022,434 | 5/1977 | Moore | 256/1 |
| 4,030,706 | 6/1977 | Ward | 256/13.1 X |
| 4,057,141 | 11/1977 | Laurie et al. | 428/903.3 X |
| 4,066,244 | 1/1978 | Yoho | 256/13.1 X |
| 4,142,821 | 3/1979 | Doring | 405/258 |
| 4,186,913 | 2/1980 | Bruner et al. | 256/13.1 |
| 4,312,600 | 1/1982 | Schaaf et al. | 256/13.1 X |
| 5,086,552 | 2/1992 | Moore | 52/DIG. 9 X |

Primary Examiner—Henry F. Epstein
Attorney, Agent, or Firm—Terrance L. Siemens

[57] ABSTRACT

A general purpose construction element such as a post, pole, or beam is constructed from discarded used tire casings. Tire casings are first cut open and laid flat to form a mat. Then they are spirally wound in the fashion of a jelly roll so as to form a laminated composite post. The properties of the rolled post can be adjusted by adjusting the properties of the adhesive which is applied to one surface of the mat prior to rolling. The laminated rubber posts may rolled to predetermined sizes by appropriately preconfiguring the mat by juxtaposing or superposing multiple single tire mats. The laminated rubber posts have excellent strength, impact and vibration absorption, and machinability. The recycling of such non-degradable waste material as well as the provision of a superior replacement for natural wood is a double edged boon to the ecology.

12 Claims, 5 Drawing Sheets

POST POLE OR BEAM MADE FROM RECYCLED SCRAP MATERIAL

FIELD OF THE INVENTION

This invention relates broadly to the field of construction and more particularly to the provision of new general purpose construction elements made from discarded pneumatic tire material. It also relates to the fields of environmental preservation and waste disposal, more specifically to recycling persistent non-biodegradable materials. Significant contributions are made to both fields by providing a new, useful and inexpensive construction material which is easily made directly from a previously nearly indestructible item of scrap material causing worldwide disposal problems. The primary benefits to the environmental preservation and waste disposal industry are: (1) that the recycled product is made from the whole discarded item thus not creating more waste; (2) that the transformation to a very useful product is done with very little energy expenditure; (3) that the entire process is virtually pollution free; and (4) that precious and dwindling forest resources may be preserved in that the product is contemplated to adequately replace wood in many applications. The very toughness that makes old tire carcasses a difficult disposal problem lends strength and durability to the unique posts, poles, beams, stakes, girders, trestles, and supports made in accordance with the principles of this invention. It will become immediately evident that the unique physical properties of the construction elements produced in the manner herein disclosed will provide important benefits in many areas of the construction field. The finished article of manufacture may take many forms as will be seen in the remainder of this specification. As such it will be appreciated that the potential uses are myriad. A comprehensive listing of all the possible fields to which this invention may be applied is limited only by the imagination and is therefore not attempted here. Some of the more obvious applications are mentioned herein in the interest of providing a full and complete disclosure of the unique properties of this hitherto unknown general purpose article of manufacture. Construction, environmental preservation, and waste disposal are seen as the fields most likely to gain immediate and substantial benefit from this invention. It is to be understood from the outset that the scope of this invention is not limited to these fields or to the specific examples of potential uses presented hereinafter.

BACKGROUND OF THE INVENTION

The vulcanized rubber pneumatic tire has proved to be both a blessing and a curse to modern society. We can't live without tires and we are just beginning to realize we can't live with millions of worn out tire carcasses clogging our landfills and littering our environment. Tires are particularly villainous at prematurely filling dump sites because their hollow toroidal shape is particularly volume consuming and they do not easily compress or nest within one another. About the only way anybody ever has gotten rid of a used tire has been to burn it. This solution has been so unsatisfactory that it is now illegal in most jurisdictions. Burning tires cause a horrible stench and pollute the air with toxic fumes and particles harmful to all life forms. Even expensive modern incineration devices, complete with scrubbers for the exhaust fumes, are inferior at destroying old tires. The steel belting materials clog the incinerator while the particulate carbon and sulfur compounds tends to foul the scrubbers. Additionally, many incineration devices consume electrical energy which serves primarily to transfer the pollution down the river to where the energy is being produced.

The difficulty in discarding worn out tires and the energy and raw materials required to manufacture them has inspired much effort to refurbish them for further use by retreading. These efforts have spawned entire industries presently listed on the New York Stock Exchange. However, there are several major problems with producing retreads. The new tread which is to be bonded to the old tire must be produced somewhere. Extensive amounts of energy are used in to produce the heat required to bond the new tread to the old tire and, even then, that crucial bonding is not always well accomplished. Both the bonding and the production of a new tread surface are, in many respects, just further examples of shipping the pollution down the river. All told, there is probably as much energy used in pollution produced in the manufacture of a retreaded tire as in the production of the original tire. Here, as incineration, the steel belts and cords used in modern tires pose severe obstacles to the successful completion of the process. Not all tires can be effectively recycled by the retreading process. For example, if the sidewall or sealing bead is damaged there is no good means to reclaim that tire. The problem here is that a tire must not only have sufficient tread but must also meet stringent standards of flexibility, strength, air permeability, and appearance.

A second alternative of somehow reforming the old tire carcass into other useful articles has been pursued by others with generally limited success. It has been proposed that old tires could be shredded and used as a form of insulation material perhaps mixed with other insulation materials such as vermiculite. This proposal does indeed recognize the important property of extremely low thermal conductivity. The actual shredding process would be extremely difficult especially when steel belts are imbedded in the old tires. Even if the metal were successfully minced up with the rubber it would have to be separated later because it would seriously degrade the thermal insulation properties of the final product. Also, the actual volume of shredded material recovered in this manner would be relatively small with respect to the volume of the original tire carcasses. You would need a mountain of old tires to produce a truckload of shredded rubber insulation material and that truckload might be enough to insulate one house. These relative quantities are, of course, not meant to be precise but merely to point out the fact that there are problems of scale involved with shredding tire carcasses to produce a voluminous product such as household insulation.

Following along with the idea of making some sort of useful product out of the old tire carcasses, there have been numerous proposals to create all kinds of decorative and ornamental articles from the tires. Examples of such uses are flower planters and landscape dividers. Two other applications of limited but useful merit will be familiar to all. Anyone from a farm or rural community will have seen a tire hung from a rope to form the familiar "tire swing". Anyone living on or near a body of water will have seen old tires attached to the sides of docks for cushioning the impacts of boats. This particular use highlights the important and useful impact absorption properties of the tire material. It has been recorded in the magazine "ABC-American Roofer and Building Improvement Contractor", February, 1978, that old truck tires have been flattened and used as a form of roofing. They are overlapped in an alternating tread-out tread-in pattern to form a watertight seal for this purpose.

Numerous United States Patents have been granted for various and sundry articles made from old tires. The largest group of these Patents are concerned with providing highway safety dividers or barriers thus effectively utilizing the inherent impact energy absorption characteristics of the rubber. Bruner et al, U.S. Pat. No. 4,186,913, shows an arrangement of side by side upright tire casings supported in a solid rubber block which is poured around the lower portions of the tires. Bruner also mentions the possible use of this arrangement as a breakwater. Ward, U.S. Pat. No. 4,030,706, shows a highway bumper guard made from two tire casings arranged concentrically within one another and with the inner casing being filled with particulate material such as sand. Ward recognizes that this arrangement will absorb impact energy by virtue of the friction between the concentric tires. As will be seen later, this type of internal friction can also be an important feature of my invention. Yoho, U.S. Pat. No. 4,066,244, shows an arrangement of upright tire casing connected together in transverse lines and rows for the purpose of absorbing impact energy. Schaaf et al, U.S. Pat. No. 4,312,600, discloses a traffic barricade or marker whose base is formed from a horizontal tire casing. Schaaf recognizes that the interior portion of the tire casing may be filled with a buoyant material thus forming a buoy marker.

Other miscellaneous exploitations of used tire casing are shown by Doring, U.S. Pat. No. 4,142,821 and by Moore, U.S. Pat. No. 4,022,434. Doring shows ground stabilization devices for embankments, etc. made from variously interconnected loops of tire treads with the sidewalls removed. Moore shows a means of stacking and interconnecting upright tires to form a fence. The tire fence is supported by partially burying the lower course of tires. Moore recognizes yet another important property of the tire material, low electrical conductivity. Moore exploits this property by stringing electrified barbed wire directly from his fence without the need for expensive electrical insulator offset devices of any kind. As will be seen later, this is another property which enhances to the overall desirability of my invention.

The many and varied previous uses for old tire casings serve to illustrate and take advantage of the important property of chemical inertness. Tire casing material will not rot, decay, decompose, deteriorate, or easily disintegrate. Tire casings are impervious to attack from mold, fungus, or bacteria, or other microorganisms. Insects, rodents, birds, bats, deer, barnacles, and other animals can not destroy tire casings. Corrosive agents, such as salt water and most acids, do not harm tire casings. Prolonged exposure to ultra-violet radiation does not degrade tire casing material. Tire material will withstand extreme climatic temperature ranges without substantial deterioration of its excellent strength and toughness characteristics.

In spite of the many and varied uses for old tire casings proposed by the prior art, it is well known that old tires are most often discarded in garbage dumps where they often collect stagnant water and serve as breeding grounds for mosquitoes and other pests. My invention proposes a new product, made from those old tires, whose usefulness is so general and application so broad that old tires will no longer need to be discarded.

SUMMARY OF THE INVENTION

A major goal of this invention is to provide a new and heretofore unknown composite form of construction material having an excellent strength to weight ratio, low electrical and thermal conductivity, superb toughness and durability, splendid vibration, sound and impact energy absorption properties, and attractive appearance. A further object of this invention is to provide means for making useful construction elements of this new material. A further object is to form these elements inexpensively by using discarded items as the primary raw material and by using a process that consumes very little energy. Another goal is to provide a viable and practical means to dispose of used tire carcasses. A further object is to preserve the environment by eliminating the need to dispose of old tires, by not creating secondary air pollution in the recycling process, and saving the forests by providing a practical replacement for wood and lumber in many instances.

It is submitted that the present invention meets or exceeds all the above objects and goals. Beginning with a tire casing in its conventional toroidal shell configuration, the carcass is first formed into a flattened sheet-like piece of rubber material. One (but not the only) way to do this is by first severing the carcass at some point on the circumference to break open the circular ring. Then a series of slits are made through the sealing bead and sidewalls as far as the tread portion. The slits are close enough together so as to form tabs in the side wall material which can be easily folded outward from the tread portion after the tread portion has been unrolled so as to lie in a single plane. At this stage of the process the original tire casing has been transformed into a relatively flat, long narrow mat with V-shaped notches along both long edges. It is important to recognize that very little energy has been involved up to this point. It is contemplated that a small amount of heat could be applied to the carcass to assist in the flattening process although this has not proved necessary in the prototypes made to date.

The key to the invention lies in the next step in the manufacture. Briefly, the flat mat is rolled tightly around itself in a spiral fashion to form a nearly solid "log" of reinforced rubber material. The rotation vector during the rolling is preferably parallel to the long axis of the mat of carcass material thus forming a relatively long slender cylinder out of a single tire carcass. An idea of the scale involved can be fleaned from the fact that a standard truck tire rolled up in this fashion will form a column approximately 11 feet long and 10 inches in diameter. By overlapping and/or interlocking several tire mats either end-to-end or side-by-side, rolled elements of virtually any length or diameter can be produced. The original smooth inner surface of the tire is rolled to the outside so as to form a smooth outer surface on the finished cylindrical column. This inside-out rolling provides other benefits more fully described in the detailed description of the invention. Iso, burnishing or otherwise machining the outer surface is more fully discussed in the detailed description. Mechanized equipment with powered rollers can be used to quickly and tightly roll, the rubber although only small forces are needed as shown by the fact that successful manual rolling with simple hand tools has been accomplished.

Further disclosure of and variations on the rolling equipment is provided in the detailed description.

One further requirement is needed in the manufacture of my composite rubber beams and columns. One skilled in the art will recognize that the natural resiliency of the rubber material will cause it to tend to unroll itself once the rolling pressure is removed. The internal friction between the several wrapped layers tends to prevent this but a force normal to the surface of the layers (or in the radial direction of the cylinder) must be present to sustain that frictional force. Also, the very outer edge of the wrap must be somehow held down or the cylinder will simply unwrap itself from the outside inward toward the center. Certainly the application of repeated flexural strain to an unrestrained column would cause it to rapidly lose its structural integrity as unravelling occurred. Although conventional bolts, rivets, or banding straps could be used as restraining means, I propose to spray or otherwise coat the tread side of the mat with an adhesive prior to its rolling. This not only prevents any unravelling of the roll but also provides a means to control the physical properties of the finished product. For example, if a stiff inflexible product were desired an adhesive or glue that hardens rigidly would be used. If, on the other hand a more yielding and flexible product were desired, a softer more flexible glue would be utilized. If, as is contemplated will be common, the properties of the original composite rubber are precisely what is desired, a thin layer of rubber solvent could be used to simply allow the layers to be bonded to each other by the pressure applied during the rolling.

It will be understood that the finished rolled product so far described is not necessarily "finished" in the sense that it is ready to be sold in commerce except perhaps as a raw material to be used in manufacturing other products. The finally layered log formed as above is in many ways similar to a piece of plywood and should be able to be machined and formed in much the same way. Special tooling may be developed for further machining these layered rubber cylinders but it is anticipated that conventional woodworking tools will be satisfactory in most instances.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
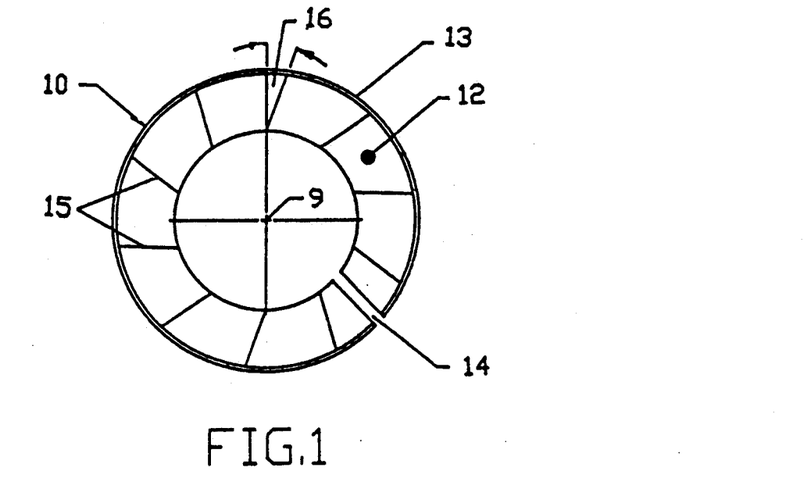
FIG. 1 is a side view of a conventional tire casing showing the position of the several cuts which are made to unwrap the tire into a flat form.

In FIG. 1 conventional tire carcass 10 is shown with markings where cuts or slits will be made prior to unrolling and flattening the carcass. The original carcass 10 is roughly in the form of a toroidal surface. A torus is formed by rotating a plane closed curve (in this case the generally circular cross-section of the tire sidewalls and tread) about an axis outside of, but in the plane of the closed curve (in this case the center line or axis of rotation of the tire). This axis is known as the toroidal axis 9. In more succinct layman terms the tire is shaped like a donut. The tire casing generally comprises two circular sealing beads 11, two sidewall portions 12, and outer circumferential tread surface 13. The inner portion of the toroid is missing as this portion is generally taken up by the wheel of the tired vehicle as is well known in conventional wheel tire geometry. The rear sealing bead and the rear sidewall portion are hidden from view in the side elevation of the tire shown. Major cut 14 is used to break the ring shape of the original tire to permit unwrapping into a flat mat like shape. This cut can be made along a plane containing the toroidal axis previously described. In this case square ends are created when the tire carcass is unwrapped. Alternately, it is possible make cut 14 along a plane parallel to but not containing the toroidal axis of revolution 9. In this case the ends of the tread portion would still be square in the unwrapped shape but the ends of the sidewall portions would be angled somewhat in the flattened condition. Also, it is possible to make cut 14 along a plane intersecting the toroidal axis at an angle. In this case the unwrapped form would not have square ends but would rather be angled so as to roughly resemble a parallelogram. It is foreseen that cut 14 could also be made along a line which does not lie in a single plane (such as a sigzag or a spiral) for the special purpose of forming two separate mats that could be abutted, interlocked, or otherwise joined to form a single mat of greater area.

Figure 2:
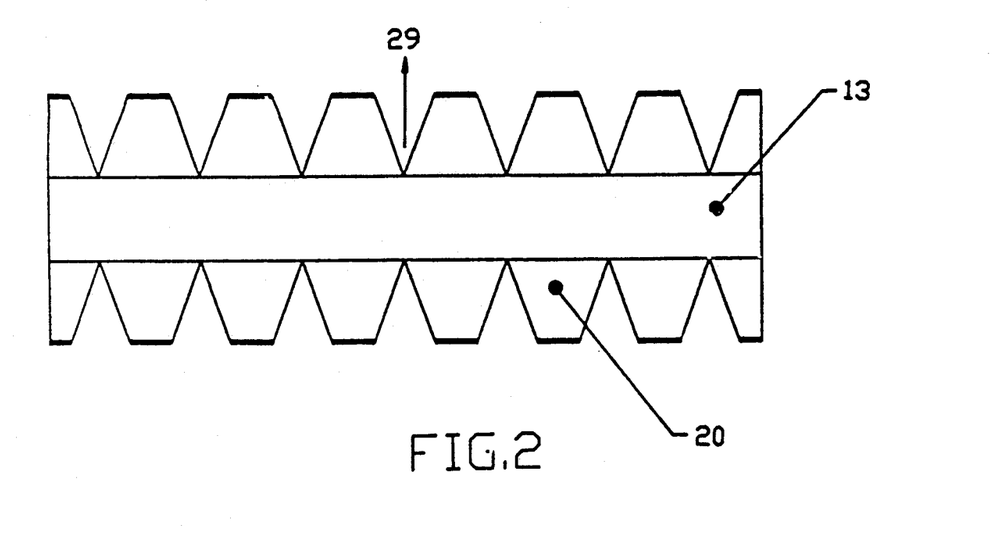
FIG. 2 is a top view of the inside surface of one embodiment of the tire after it has been cut and laid out flat.
Figure 3:
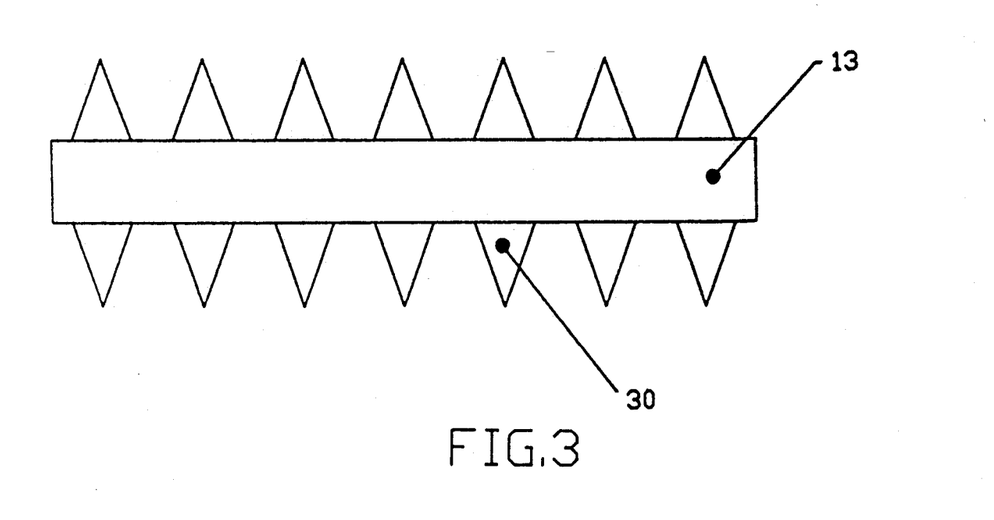
FIG. 3 is a top view of the inside surface of another embodiment of the tire after it has been cut in a different manner and laid out flat.

One skilled in the art will recognize that cut 14 will not alone be sufficient to allow the tire casing to be flattened into a mat as described. The sidewall portions 12 must also be slit with a series of approximately radial cuts 15 through the sealing bead 11 out as far as, but not through, the tread section 13. It is a matter of design choice as to the actual number of such cuts 15 needed. In general the cuts 15 should be close enough together to allow easy outward folding of the sidewall tab portions 20 (see FIG. 2) away from the tread portion 13. The cuts 15 may be angled slightly from the radial direction as shown by angle 16. The precise angle of these cuts determines the angulation of the trapezoidal sidewall tabs 20 in the flattened form of the tire casing shown in FIG. 2. As with the major cut 14 these sidewall cuts 15 might be varied at will to achieve desired shapes of the flattened mat surface. Also they may be more than simple slits and serve to actually remove portions of the side wall so as to form special shapes in the sidewall tabs 20. These tab shapes may be chosen to nest with one another to form a mat of the same length but double width. The subsequent rolling (described later) of such a double width mat would form a post of larger diameter than the rolling of a single width mat. FIG. 3 shows a mat formed with such a special cut so as to produce triangular sidewall tabs 30 of just the right shape to fit in the triangular notches between trapezoidal tabs 20 in the mat of FIG. 2. It will be recognized that the possible variations of special cuts are endless and may be used to fit numerous flattened tire mats together both in side-by-side and end-to-end relationships. It is contemplated, although not shown, that cuts could be made such that adjacent mats could actually be interlocked with one another in jigsaw puzzle fashion. It is also contemplated that numerous mats could be laid atop one another with the thicker tread portion of one mat being placed above the thinner sidewall portion of the next to form an overall mat of uniform thickness throughout. All these possible multiple mat layouts are within the purview of this invention and might be chosen in accordance with the design considerations with regard to the particular final rolled product now to be described with reference to FIGS. 4 through 6.

Figure 4:
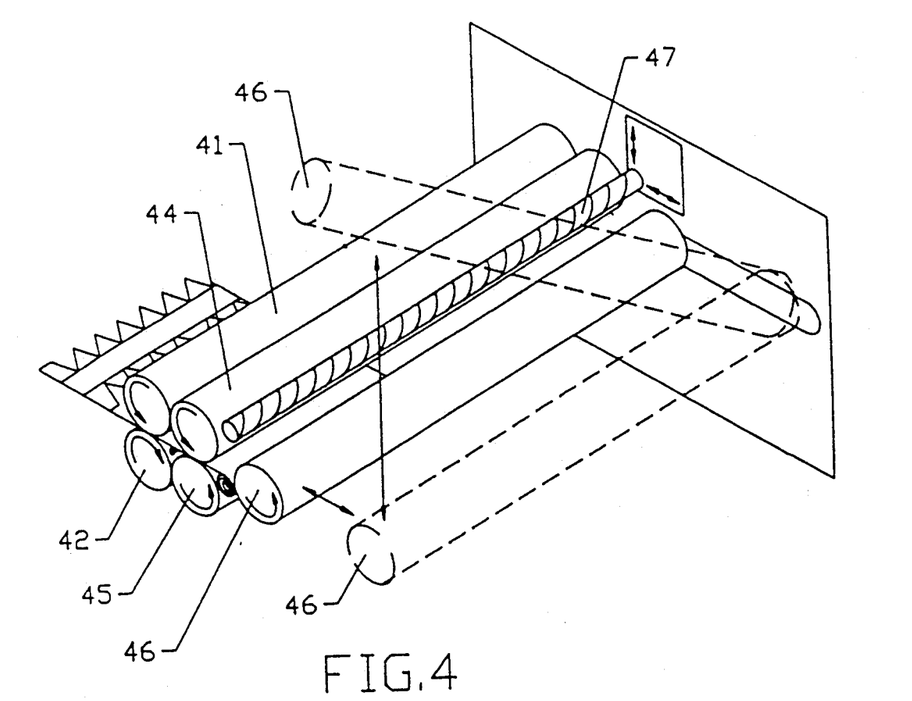
FIG. 4 is a schematic side view of a series of powered rollers just starting to form a composite rubber cylinder from the flat section of FIG. 2.

FIG. 4 schematically illustrates a rolling machine into which the previously described mats are fed for rolling into a finished post-like product. Arrow 29 in FIG. 2 indicates the preferred direction of feed for a single mat. The mat is placed smooth side up and advanced so as to be grabbed and fed to the right by powered feed rollers 41 and 42. These and all other rollers rotate in the direction shown by the curved arrows. Rollers 41 and 42 are designed to press tightly against the mat material and forcibly advance it by friction. If necessary, serrations could be provided on the surface of the feed rollers to ensure a positive feed. Just past the feed rollers the mat passes over a glue applicator 43 which serves to coat one surface of the mat with some form of glue, adhesive, or solvent to bind together the successive layers of the rolled item. The applicator itself could be in the form of a sprayer, a rotary brush, or any of numerous other possibilities. The important thing is that the adhesive be applied uniformly to at least one surface of the mat. Since the mat will be rolled with the smooth surface outward, the adhesive is shown being applied to the opposite or tread side of the mat. This is the preferred side for applying the adhesive. One reason is that the adhesive will tend to fill the grooves in the original tread pattern. Then as the mat is roller up the avaialable volume in these grooves is reduced by virtue of the top portion of each tread groove being angled inwardly. This reduction in the groove volume in turn forces adhesive out of the grooves under pressure to fill any existing nearby void that might exist. The net effect is to create a solid rolled post structure with any voids in the volume being filled with adhesive. Although the adhesive is shown being applied to the bottom surface because this is the tread surface, it is contemplated that the entire setup may be inverted such that the tread surface faces upward and gravity would thereby assist in the application of adhesive now from the top side. In this setup the rollers would still be arranged to roll the post with the smooth or non-tread side of the mat outward.

After the mat passes the glue applicator device it is guided so as to pass through a gap between the first two of three winder rollers 44, 45, and 46 to be subsequently trapped therebetween. The winder rollers 44, 45, and 46 all rotate in the same counterclockwise direction as seen in FIG. 4. They are arranged downstream of the feed rollers and their rotation axes are substantially parallel to each other and to the axes of the feed rollers. After traversing the gap between rollers 44 and 45 the forward edge of the mat will come into contact with the left hand side of far winder roller 46. The rotation of the far winder roller 46 will force the forward edge of the mat to take a downward turn. The mat then contacts winder roller 45 which forces it to turn upward and to the left. Now the leading edge of the mat will strike the lower surface of a rightward traveling portion of the remainder of the mat which is presently passing under winder roller 44. The leading edge is thus turned again to the right to travel in parallel with the just met portion of the remainder of the mat. Thus the mat is rolled in a spiral manner into a post or column like structure. As the diameter of the tire roll increases, more room is required in the region between the three winding rollers. This is provided by arranging the axles of winder roller 46 so that they may move generally rightward while maintaining a certain predetermined amount of pressure of the growing tire roll. A general purpose shaper tool 47 may be used primarily for applying finishing touches on the exterior surface of the tire roll before it is expelled from the rolling machine. For example, it could be used to abrade away any high spots or lumps and form a smooth, perfectly rounded final product. The shaper tool might also be used for more complex machining operations such as cutting spiral grooves or screw threads into the exterior surface of the finished product.

Figure 5:
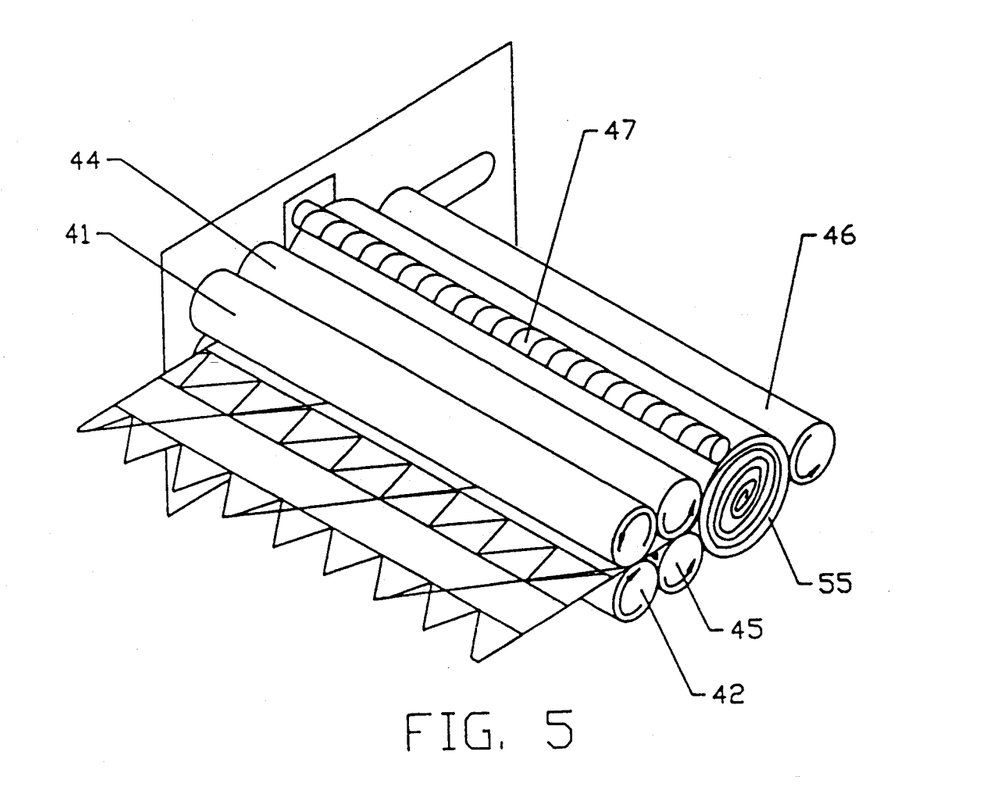
FIG. 5 is a schematic side view of the powered rollers of FIG. 3 after the complete formation of the composite rubber cylinder.

FIG. 5 differs from FIG. 4 only in that it shows a completed tire roll 55 within the winder rollers and that far winder roller 46 is shown as having moved outward to accommodate the diameter of the tire roll and is capable of being swung upward to allow the expulsion of the finished tire roll from the roller machine. There are, of course, many variations on the rolling machinery that will occur to one skilled in the art and that will effect the final nature of the finished product. One such variation would be to arrange the winding rollers slightly out of parallel with one another so as to wrap the rubber mat material into a conical rather than cylindrical form. This would be particularly useful when making long slender items such a utility poles. The scope of this the claimed subject matter is not to be limited to the precise forms that could be manufactured by the roller machinery herein disclosed. That machinery is shown here only schematically to illustrate that the rolled composite rubber product may indeed be easily formed by conventional mechanical means well within the realm of current technology. Claims to any further special purpose machinery particularly suited to forming my rolled composite rubber products might form the basis for future Patents.

Figure 6:
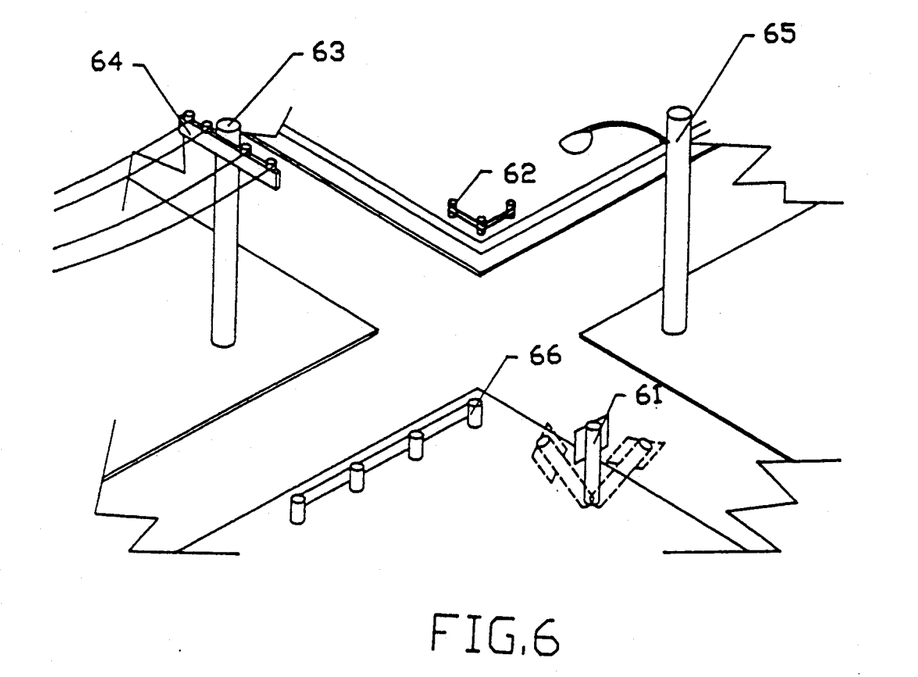
FIG. 6 is an isometric view illustrating various applications for the invention.

FIG. 6 illustrates in one common street scene a few of the contemplated uses for my rolled composite rubber product. The street sign post 61, fence posts 62, utility poles 63, lamp post 65, and guard rail support posts 66 can all be made from the composite rubber products of this invention. As all of these items tend to be clustered about streets and highways the previously mentioned impact energy absorption characteristics could be put to good use by all of these items. My rolled composite rubber will absorb considerably more energy than is attributable to the mere hysteresis effect exhibited by flexing rubber. This is because the numerous layers of rubber are forced to first tear the adhesive agent bonding them together and then frictionally slide against one another as further deformation occurs. Judicious selection of the adhesive bonding agent, the naturally occurring high coefficient of friction between rubber on rubber, and the natural hysteresis effect of flexing rubber thus will all combine to provide far better impact energy absorption and highway safety than previously possible. These factors combine to make my posts an excellent choice for highway barrier support posts 66. They will provide better collision resistance at far less expense than the aluminum I beam supports presently used in many locations. It is also contemplated that such an energy absorbing beam or bumper could be built into the vehicle to provide even further safety.

The elements of this invention can also be used to significant advantage as electrical utility poles. Not only could the upright portion of the pole 63 be made of my rolled composite rubber, but also the cross beams 64 forming the wire supporting structure could be made of my rolled composite rubber beams. A significant advantage is that the heavy and expensive insulator devices used to string high voltage wires would no longer be needed. The excellent electrical insulation properties of this invention should allow the direct supporting of such high voltage wires. This advantage is over and above the previously discussed durability and corrosion resistance characteristics which are far superior to the wooden poles commonly used in this application.

The simple sign post support 61 would also be substantially superior when made in accordance with the principles of this invention. If an unfortunate motorist should happen to hit one of these posts it would not snap off and require replacement as do present wooden posts. Also, it would not rigidly stand up and damage the motor vehicle as do present metal posts. Rather, my composite rubber post would merely flex out of the way and be easily restored to use after the collision. As a bonus, the post will neither rot nor rust.

A final example of an ideal use for my invention is afforded by street lamp post 65. Although we do not often think of it, such a post must provide a pathway for electrical wiring. The presently used electrical wiring for this purpose is expensive because of the heavy duty outdoor type insulation required. My post itself would provide the insulation for the wires and thus reduce the cost of both the light post and the wiring.

It is to be understood that the provided illustrative examples are by no means exhaustive of the many possible uses for my invention.

From the foregoing description, one skilled in the art can easily ascertain the essential characteristics of this invention and, without departing from the spirit and scope therefore, can make various changes and modifications of the invention to adapt it to various usages and conditions.

Upon further study of the specification and appended claims, further objects and advantages of this invention will become apparent to those skilled in the art.

I claim:

1. An article for use as a multiple purpose construction element comprising;
    a generally cylindrical and substantially solid composite post comprising;
        a flexible mat spirally wound upon itself about an axis to form multiple overlapping layers, said axis coinciding with the cylindrical axis of said composite post, said flexible mat being formed from used tire casings having a series of slits in the sidewalls thereof, and
        adhesive means interposed between adjacent ones of said multiple overlapping layers of said mat; whereby
    said adjacent ones of said layers are held together by said adhesive means so as to provide structural rigidity to said article.

2. The article of claim 1, wherein said adhesive means is applied to one surface of said flexible mat prior to spirally winding it into said composite post.

3. The article of claim 1, wherein the overall mechanical properties of strength, rigidity, and flexibility of said article are varied by choosing different adhesive means.

4. The article of claim 1, wherein said flexible mat comprises one or more used tire casings which have been cut open and flattened in such a manner so as to facilitate juxtaposing or superposing individual tire casings to preform said flexible mat into an appropriate size and shape to form said composite post to predetermined dimensions.

5. The article of claim 4, wherein said adhesive means is applied to an original tread side of said tire casings and said flexible mat is rolled such that an original smooth inside surface of each said tire casing forms the outside exposed surface of said cylinder.

6. At least two articles as in claim 4, in combination with electrical utility wires, wherein said articles are joined together to form a utility pole and a cross beam for supporting said electrical utility wires.

7. The article of claim 4, in combination with a highway guard rail, wherein a series of said article serve as supports for said highway guard rail and serve to enhance the impact energy absorption of said guard rail.

8. The article of claim 4, in combination with a street sign, wherein said article is used as a resilient upright support post for said street sign.

9. The article of claim 4, in combination with a fence, wherein a series of said articles serve as upright posts for said fence.

10. The article of claim 4, in combination with a street lamp, wherein said article provides both the physical support and the insulated conduit for said street lamp.

11. A method of producing a rolled composite construction element comprising the steps of:
    (1) cutting through the circular ring of a used tire casing;
    (2) cutting a series of generally radial slits in the side walls of said tire casing:
    (3) unrolling said tire casing and folding back the portions of said sidewalls between said slits so as to form a relatively flat mat;
    (4) applying an adhesive means to one surface of said mat;
    (5) rolling up said mat, in a spiral manner, to form a layered but generally solid cylindrical article with alternating layers of tire casing and adhesive means;
    (6) using said article as a general purpose construction element.

12. The method of claim 11, further comprising the step of refinishing the exterior surface of the cylindrical object with a shaping tool after the final rolling step.

* * * * *